United States Patent
Zhang

(10) Patent No.: US 10,708,482 B2
(45) Date of Patent: *Jul. 7, 2020

(54) TERMINAL HAVING CAMERA MODULE

(71) Applicant: Guangdong Oppo Mobile Telecommunications Corp., Ltd., Dongguan, Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,372

(22) Filed: Jun. 20, 2019

(65) Prior Publication Data
US 2019/0306394 A1    Oct. 3, 2019

Related U.S. Application Data

(63) Continuation of application No. 15/824,490, filed on Nov. 28, 2017, now Pat. No. 10,389,927.

(30) Foreign Application Priority Data

Mar. 7, 2017    (CN) .......................... 2017 1 0132546

(51) Int. Cl.
*H04N 5/225*        (2006.01)
*H04M 1/02*         (2006.01)
(Continued)

(52) U.S. Cl.
CPC ........... *H04N 5/2257* (2013.01); *G03B 29/00* (2013.01); *H04M 1/0264* (2013.01);
(Continued)

(58) Field of Classification Search
CPC .... H04N 5/2257; H04N 5/247; H04N 5/2251; H04N 5/2252; H04N 5/2253; H04N 5/2259; G03B 29/00; G02B 13/001
See application file for complete search history.

(56) References Cited

U.S. PATENT DOCUMENTS 7,907,840 B2 *    3/2011    Schack ................. G03B 17/17
                                                         348/375
9,692,953 B2 *    6/2017    Xiong .................. G03B 11/043
(Continued)

FOREIGN PATENT DOCUMENTS

CN            2745106 Y        12/2005
CN            2762162 Y         3/2006
(Continued)

OTHER PUBLICATIONS

Extended European search report issued in corresponding European application No. 17202810.2 dated Mar. 15, 2018.
(Continued)

*Primary Examiner* — Kelly L Jerabek
(74) *Attorney, Agent, or Firm* — Young Basile Hanlon & MacFarlane, P.C.

(57) ABSTRACT

A terminal is provided. The terminal includes a main body, a camera module, and a driving structure disposed in the main body. A receiving chamber configured to receive the camera module is defined in the main body. The driving structure is connected to the camera module to drive the camera module to move from the inside of the receiving chamber to the outside of the main body or drive the camera module to move from the outside of the main body into the inside of the receiving chamber.

14 Claims, 11 Drawing Sheets

(51) Int. Cl.
    *G03B 29/00*     (2006.01)
    *H04N 5/247*     (2006.01)
    *G02B 13/00*     (2006.01)

(52) U.S. Cl.
    CPC ........... *H04N 5/2253* (2013.01); *H04N 5/247* (2013.01); *G02B 13/0065* (2013.01); *H04M 2250/20* (2013.01); *H04N 5/2252* (2013.01)

(56) References Cited

U.S. PATENT DOCUMENTS

| | | | | |
|---|---|---|---|---|
| 9,736,383 | B2* | 8/2017 | Evans | H04N 5/2254 |
| 9,834,154 | B2* | 12/2017 | Carson | B60R 11/04 |
| 10,021,296 | B2* | 7/2018 | Fan | H04N 5/2251 |
| 10,389,927 | B2* | 8/2019 | Zhang | H04M 1/0264 |
| 2005/0014527 | A1 | 1/2005 | Chambers et al. | |
| 2006/0033832 | A1 | 2/2006 | Shin | |
| 2010/0124955 | A1 | 5/2010 | Pegg | |
| 2014/0218587 | A1* | 8/2014 | Shah | G03B 5/00 348/340 |
| 2015/0009349 | A1* | 1/2015 | Kim | H04N 5/2258 348/218.1 |
| 2015/0189175 | A1 | 7/2015 | Fan et al. | |
| 2016/0191760 | A1* | 6/2016 | Wu | H04N 5/2251 348/262 |
| 2017/0064054 | A1 | 3/2017 | Lombardi et al. | |
| 2017/0094038 | A1 | 3/2017 | Chen et al. | |
| 2018/0262663 | A1 | 9/2018 | Zhang | |

FOREIGN PATENT DOCUMENTS

| | | |
|---|---|---|
| CN | 2837894 Y | 11/2006 |
| CN | 201066423 Y | 5/2008 |
| CN | 101236353 A | 8/2008 |
| CN | 203206372 U | 9/2013 |
| CN | 104618542 A | 5/2015 |
| CN | 204408431 U | 6/2015 |
| CN | 105049686 A | 11/2015 |
| CN | 205029708 U | 2/2016 |
| CN | 205105320 U | 3/2016 |
| CN | 105554196 A | 5/2016 |
| CN | 105554200 A | 5/2016 |
| CN | 205510137 U | 8/2016 |
| CN | 205725913 U | 11/2016 |
| CN | 106850896 A | 6/2017 |
| CN | 206251153 U | 6/2017 |
| CN | 107071242 A | 8/2017 |
| CN | 206413083 U | 8/2017 |
| CN | 207118136 U | 3/2018 |
| CN | 207354463 U | 5/2018 |
| EP | 3373562 A1 | 9/2018 |
| JP | 2003188968 A | 7/2003 |
| KR | 20060096681 A | 9/2006 |
| TW | 201435467 A | 9/2014 |
| WO | 2014161401 A1 | 10/2014 |
| WO | 2015148061 A1 | 10/2015 |

OTHER PUBLICATIONS

International search report issued in corresponding international application No. PCT/CN2017/111807 dated Jan. 26, 2018.
Extended European search report issued in corresponding European application No. 18190352.7 dated Dec. 3, 2018.
International search report issued in corresponding international application No. PCT/CN2018/102973 dated Nov. 28, 2018.

\* cited by examiner

TERMINAL HAVING CAMERA MODULE

CROSS-REFERENCE TO RELATED APPLICATION(S)

The present application a continuation of U.S. application Ser. No. 15/824,490, filed on Nov. 28, 2017, which claims priority to Chinese Patent Application No. 201710132546.6, filed on Mar. 7, 2017, the contents of both of which are hereby incorporated by references in their entireties.

TECHNICAL FIELD

The present disclosure relates to display technology, and more particularly, to a terminal having a camera module.

BACKGROUND

A terminal such as a smart phone, a tablet computer, a notebook computer, and a personal digital assistant (PDA) includes a display screen displaying an image or video.

Such a terminal may include have various functions such as a photographing function, a user identifying function, and so on. With development of intelligent communication technology, a large display screen displaying the image or video has become more and more popular.

Currently, the terminal typically has an image capturing function, and therefore, should have a non-display area where a camera-mounting hole is defined so as to mount a camera module. However, since the terminal has a limited size, the display screen is reduced in size when the non-display area is provided so as to define the camera-mounting hole where the camera module is to be mounted.

BRIEF DESCRIPTION OF DRAWINGS

In order to more clearly describe technical solutions according to implementations of the present disclosure, accompanying drawings used for describing the implementations will be briefly introduced hereinafter. Apparently, the accompanying drawings described below merely show some implementations of the present disclosure, and persons skilled in the art may also derive other drawings from these accompanying drawings without creative efforts.

For a full understanding of the present disclosure and its advantages, a description is provided below with reference to the accompanying drawings in which identical or similar reference numerals represent identical or similar parts.

DETAILED DESCRIPTION

Figure 1:
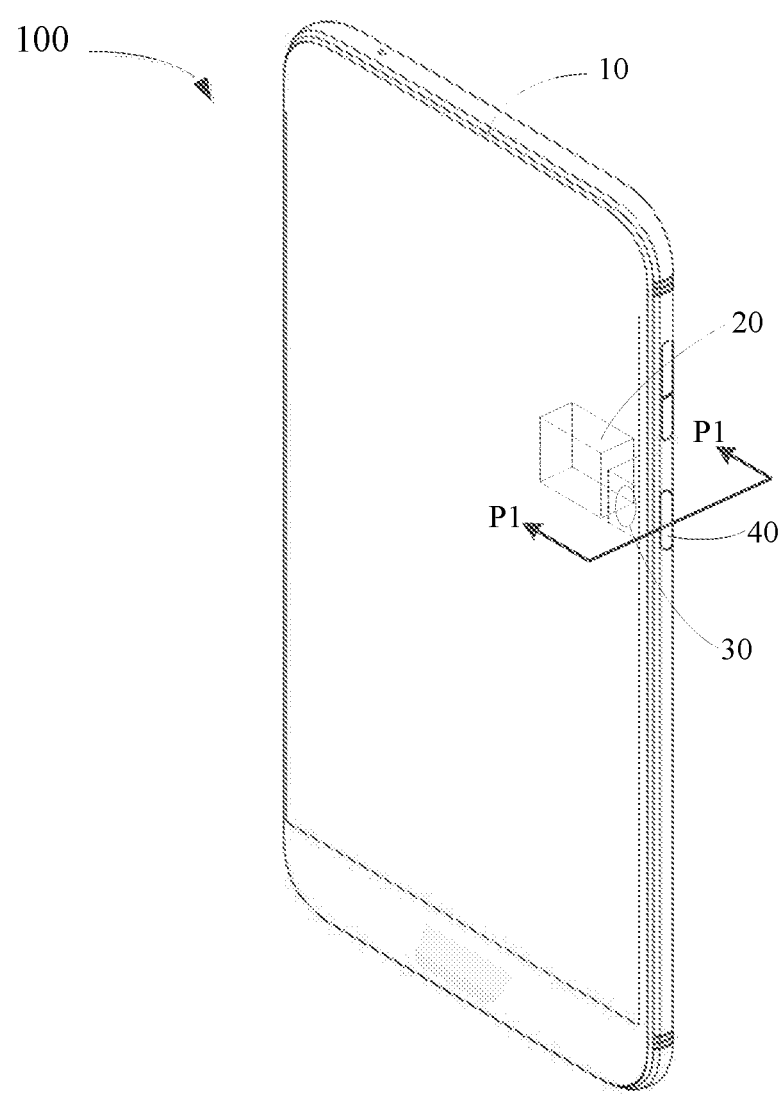
FIG. 1 is a perspective view of a terminal according to an implementation of the present disclosure.

A clear, complete description for the technical solutions of implementations of the present disclosure is provided hereinafter, in conjunction with the drawings in the implementations of the present disclosure. Apparently, the implementations to be described below are a part, rather than all of implementations of the present disclosure. Other implementations obtained by persons skilled in the art from the implementations given herein without creative efforts should all fall within the protection scope of the present disclosure.

The terms "first", "second", "third", and the like in the description, claims, and drawings are used to distinguish between different objects, rather than used to indicate a specified order or sequence. It should be understood that the objects described in this way may be exchanged when appropriate. Furthermore, the terms "include" and "comprise" as well as any variants thereof are intended to cover non-exclusive inclusion.

In the present disclosure, FIG. 1 to FIG. 14 discussed hereinafter and various implementations for describing principles of the present disclosure are merely for illustration are not construed as a limitation on the scope of the present disclosure. It should be understood by persons skilled in the art that the principles of the present disclosure may be implemented in any suitably arranged device. A detailed description is provided for exemplary implementations, examples of which are illustrated in the accompanying drawings. In addition, terminals according to the exemplary implementations will be described in detail with reference to the accompanying drawings in which identical or similar reference numerals represent identical or similar parts.

Although the terms "first", "second", etc. may be used to describe various elements, these elements should not be limited by these terms. These terms are only used to distinguish between different elements. For example, a first element could be termed a second element, and similarly, a second element could be termed a first element, without departing from the scope of exemplary implementations. The term "and/or" as used herein includes any and all combinations of one or more of the associated listed items.

The terminology used herein is for describing particular embodiments only and is not intended to be limiting of the present disclosure. The singular form is intended to include the plural form as well, unless the context clearly indicates otherwise. It should be understood that the terms "comprises", "comprising", "includes" and/or "including", when used herein, specify the presence of stated features, integers, steps, operations, elements, components, or groups thereof disclosed in the present disclosure, but do not preclude the presence or addition of one or more other features, integers, steps, operations, elements, components, or groups thereof. In the drawings, identical or similar reference numerals represent identical or similar parts.

Figure 2:
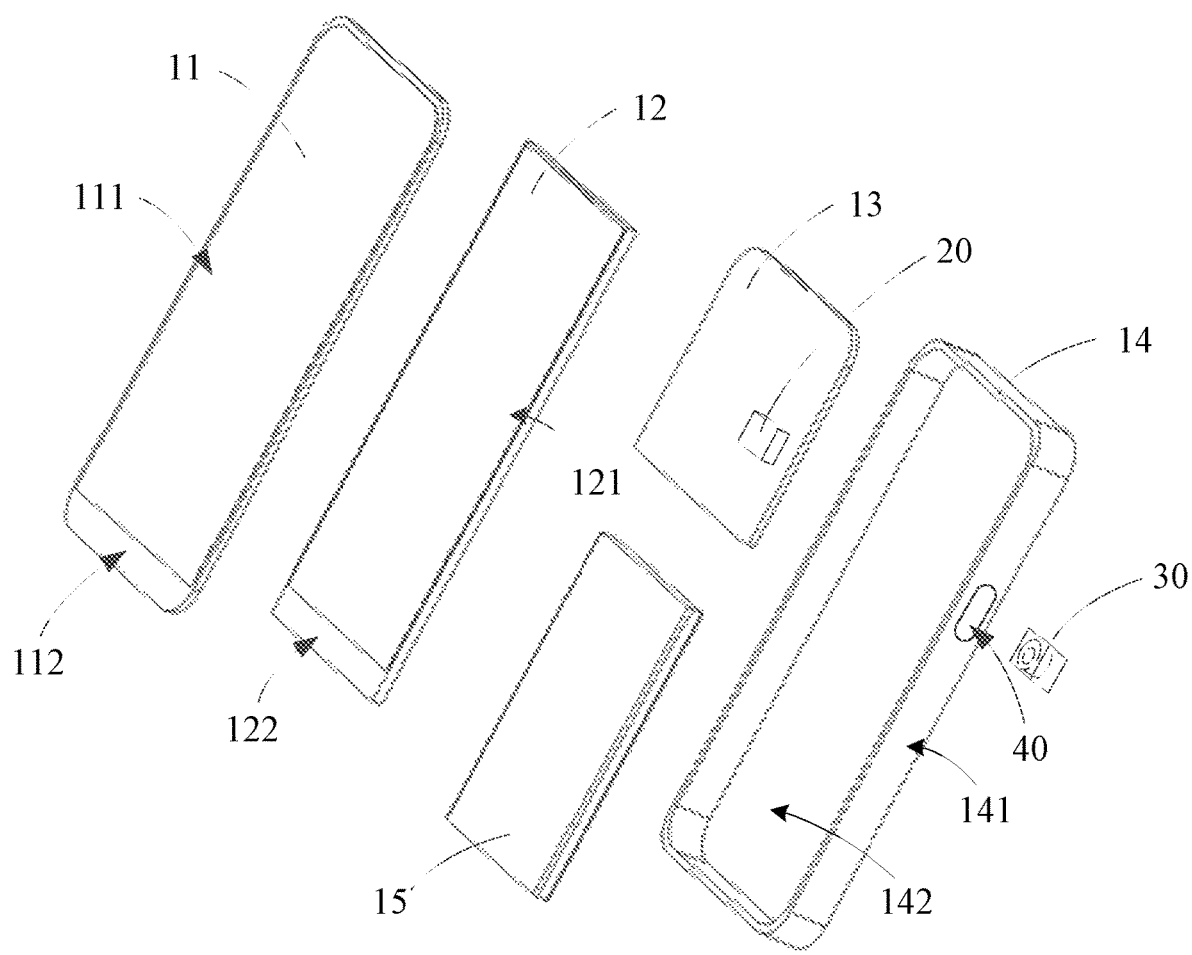
FIG. 2 is a schematic exploded view of a terminal according to an implementation of the present disclosure.

FIG. 1 is a perspective view of a terminal 100 according to an implementation of the present disclosure. FIG. 2 is a schematic exploded view of the terminal 100 according to an implementation of the present disclosure. The terminal 100 as illustrated in FIG. 1 and FIG. 2 is a smart phone, however, the terminal 100 may also be any terminal including a display screen such as a tablet computer, a notebook computer, and a PDA.

As illustrated in FIG. 1 and FIG. 2, the terminal 100 may include a main body 10, a driving structure 20, and a camera module 30.

The driving structure 20 is disposed in the main body 10, and a receiving chamber 40 configured to receive the camera module 30 is defined in the main body 10. The driving structure 20 is connected to the camera module 30 to drive the camera module 30 to move from the inside of the receiving chamber 40 to the outside of the main body 10 or drive the camera module 30 to move from the outside of the main body 10 into the inside of the receiving chamber 40.

As illustrated in FIG. 2, the main body 10 may include a cover plate 11, a display screen 12, a printed circuit board 13, and a housing 14. In addition, the terminal 100 may further include a power supply 15. The display screen 12 may be electrically connected to the printed circuit board 13 via a flexible printed circuit.

The main body 10 may further include functional components such as at least one sensor, at least one fingerprint module, and the like. It should be understood by persons skilled in the art that the structure of the main body 10 as illustrated in FIG. 2 is not intended to be a limitation on the main body of the present disclosure, and the main body 10 may include more or fewer components, or combinations thereof, or different arrangements thereof.

In some implementations, the cover plate 11 may be disposed on the front of the display screen 12. In the present disclosure, "front" refers to a direction in which a surface of the display screen 12 displaying information faces, while "back" refers to a direction to opposite to "front".

The cover plate 11 may have an exposing area 111 that exposes the information displayed by the display screen 12 and a non-exposing area 112 that prevents visibility from the outside of the terminal 100. The non-exposing area 112 may include a lightproof layer, e.g., a black shading layer, such that the inside of the terminal 100 is invisible. In some implementations, the lightproof layer is an ink layer.

The display screen 12 is configured to display the information such as images, videos or texts. The display screen 12 may include a front surface displaying the information and a back surface located opposite to the front surface.

In some implementations, as illustrated in FIG. 2, the display screen 12 may include a display area 121 configured to display the information and a non-display area 122 not displaying the information. The display area 121 may serve as a main display area of the display screen 12 and is configured to display most of the information. The non-display area 122 may be disposed on the periphery of the display area 121, and may be configured to dispose an integrated circuit (IC) configured to control the display of the information on the display screen 12. The non-exposing area 112 of the cover plate 11 may be disposed on the front of the non-display area 122 of the display screen 12 and prevent the non-display area 122 of the display screen 12 from being seen from the outside.

Figure 3:
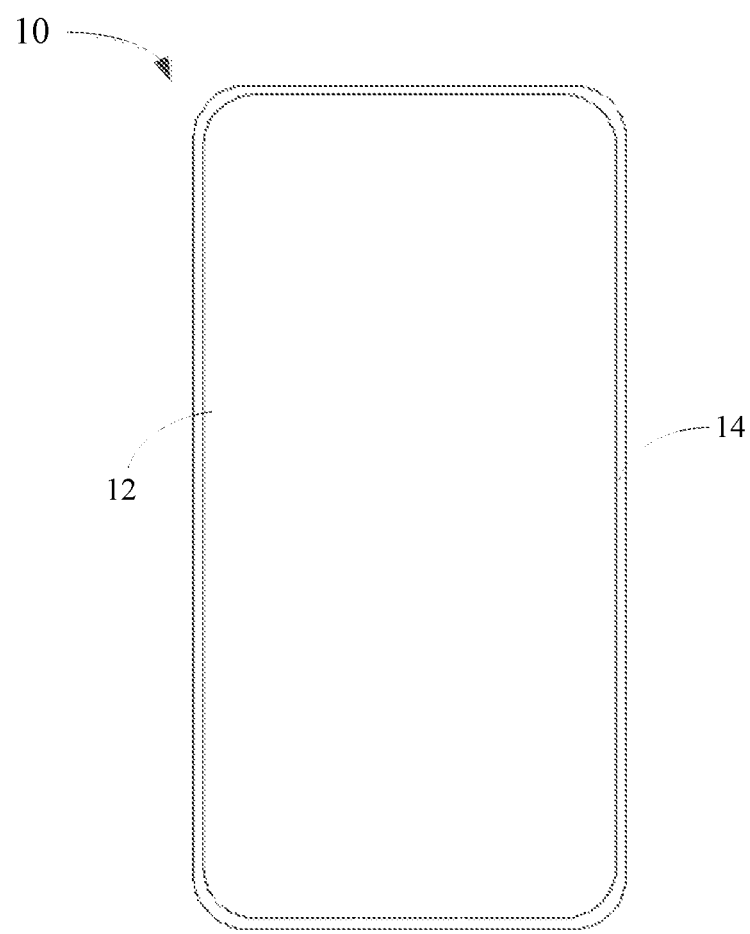
FIG. 3 is a front view of a terminal according to an implementation of the present disclosure.

FIG. 3 is a front view of the terminal 100. In some implementations, as illustrated in FIG. 3, the display screen 12 may be a borderless display screen. That is to say, the display screen 12 may merely include the display area 121, and not include the non-display area 122, such that a larger display screen is achieved.

The housing 14 may consist of a single component or a plurality of combinable components. As illustrated in FIG. 2, the housing 14 may include a circumferential wall 141 and a back plate 142 connected to the circumferential wall 141. The housing 14 may be made of at least one of plastic material, ceramic material and metal material. In some implementations, the cover plate may be connected to the circumferential wall 141 of the housing 14 and opposite the back plate 142 of the housing 14, so as to form an enclosed space.

In some implementations, the main body 10 includes a front plate and a circumferential wall connected to the front plate, and the receiving chamber 40 is disposed next to the circumferential wall. Actually, the cover plate 11 may function as the front plate of the main body 10, and the circumferential wall 141 of the housing 14 may function as the circumferential wall of the main body 10. As illustrated in FIG. 2, the receiving chamber 40 has an aperture allowing the camera module 30 to move into or out of the receiving chamber 40. The aperture is defined in the circumferential wall 141 of the housing 14.

Figure 4:
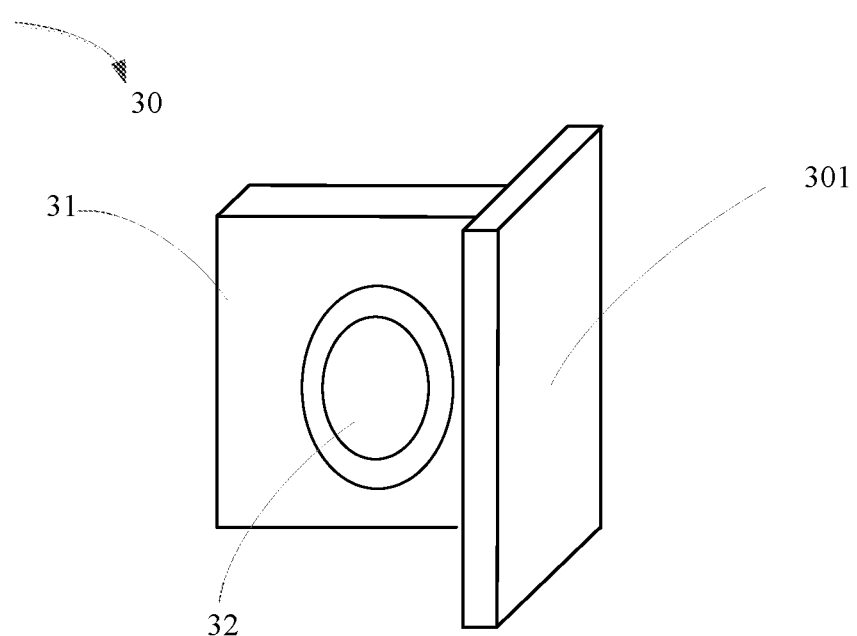
FIG. 4 is a schematic view of a first structure of camera module according to an implementation of the present disclosure.

FIG. 4 is a schematic view of a first structure of the camera module 30 according to an implementation of the present disclosure. As illustrated in FIG. 4, the camera module 30 includes a mounting base 31 connected to the driving structure 20 and a first camera 32 disposed on the mounting base 31. When the driving structure 20 drives the camera module 30 to move to the outside of the main body 10, the first camera 32 faces a plane where the cover plate 11 is located.

As illustrated in FIG. 4, the camera module 30 includes a side wall 301 which is located in the aperture of the receiving chamber 40 to prevent dust, etc., from entering the receiving chamber 40 when the camera module 30 is received in the receiving chamber 40. The side wall 301 has an inner surface and an outer surface. In at least one implementation, the mounting base 31 is located in the center or on the edge of the inner surface of the side wall 301. In at least one implementation, the mounting base 31 is plate-shaped, and the side wall 301 is perpendicular to the mounting base 31.

Figure 5:
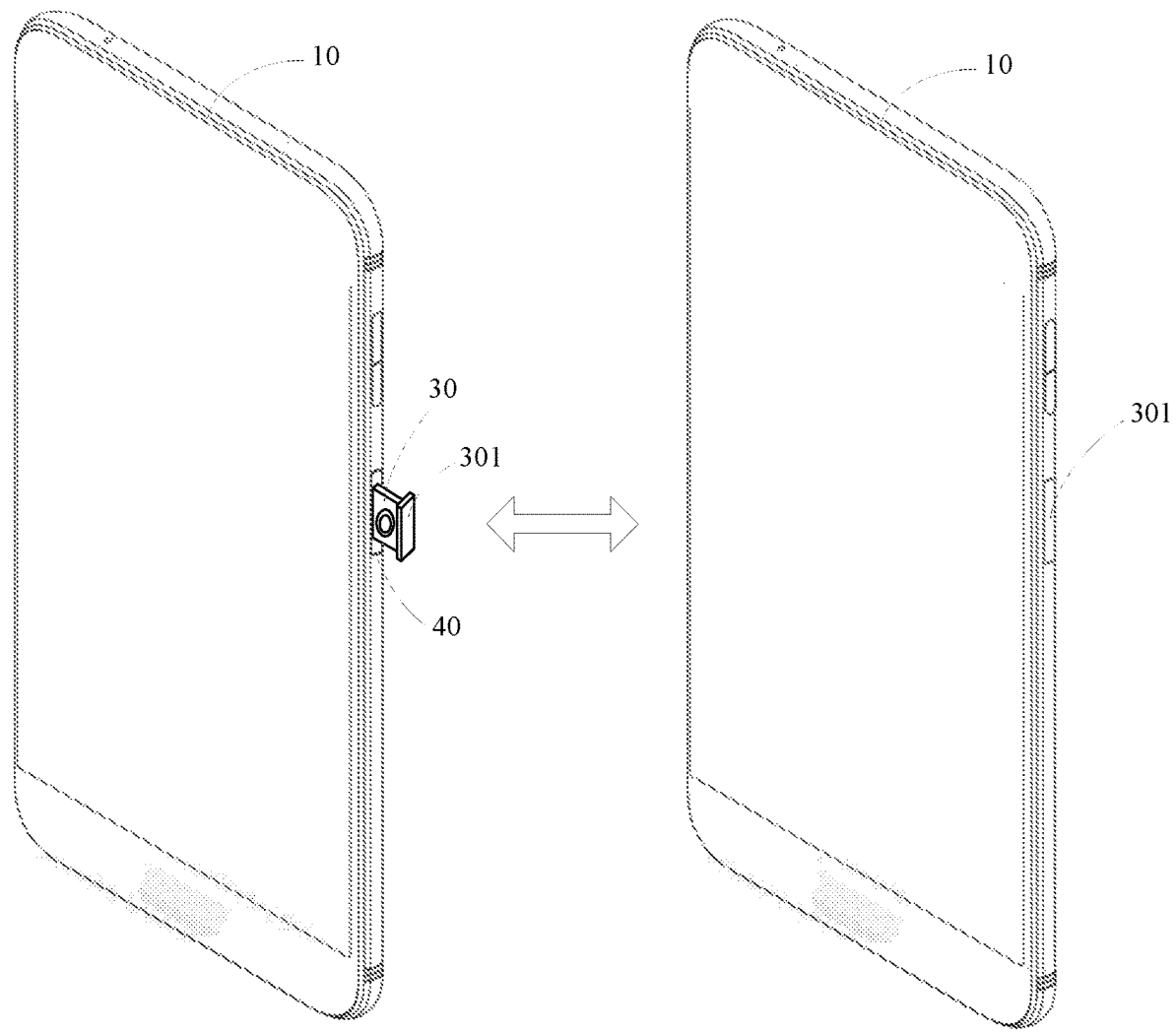
FIG. 5 is a schematic view of an engagement relationship between a camera module and a main body according to an implementation of the present disclosure.

FIG. 5 is a schematic view of an engagement relationship between a camera module and a main body according to an implementation of the present disclosure. As illustrated in FIG. 5, the aperture of the receiving chamber 40 is defined in the right portion of the circumferential wall 141 of the housing 14. The aperture of the receiving chamber 40 has a size matched to that of the camera module 30, and hence, when the camera module 30 is received in the receiving chamber 40, the outer surface of the side wall 301 of the camera module 30 is flush with an outer surface of the circumferential wall 141 of the housing 14, such that the outer surface of the side wall 301 and the outer surface of the circumferential wall 141 are located in the same plane. In at least one implementation, when the camera module 30 is received in the receiving chamber 40, the periphery of the side wall 301 may coincide with the periphery of the aperture of the receiving chamber 40 such that the outer surface of the side wall 301 is apparently integrated with the outer surface of the circumferential wall 141.

Figure 6:
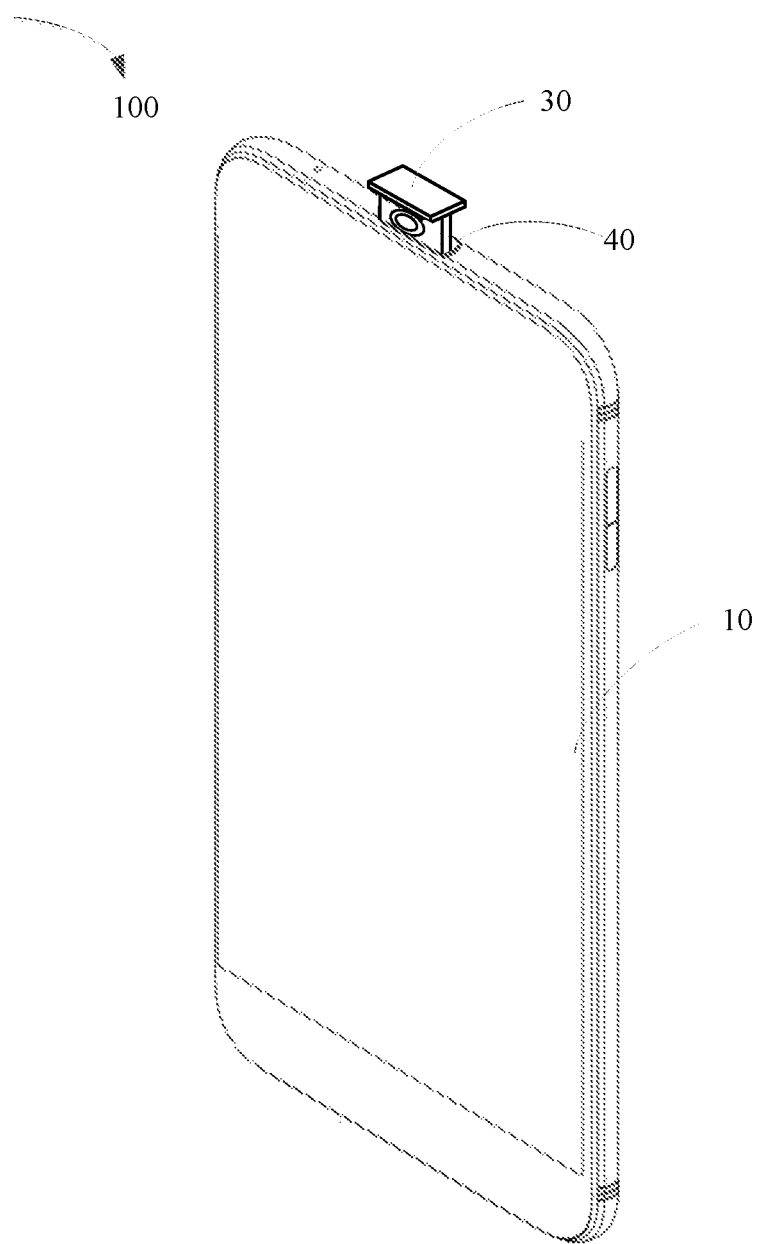
FIG. 6 is a schematic view of another engagement relationship between the camera module and the main body according to anther implementation of the present disclosure.

In some implementations, the aperture of the receiving chamber 40 may also be defined in the top portion, the bottom portion, or the left portion of the circumferential wall 141 of the main body 10. FIG. 6 is a schematic view of another engagement relationship between the camera module and the main body according to anther implementation of the present disclosure. As illustrated in FIG. 6, the aperture of the receiving chamber 40 is defined in the top portion of the circumferential wall 141 of the main body 10, and the camera module 30 is movably received in the receiving chamber 40. When the camera module 30 is moved to the outside of the main body 10, the camera 32 faces the plane where the cover plate 11 is located.

In some implementations, the main body 10 further includes a back plate opposite its front plate and connected to its circumferential wall. Actually, the back plate 142 of the housing 14 may function as the back plate of the main body 10.

Figure 7:
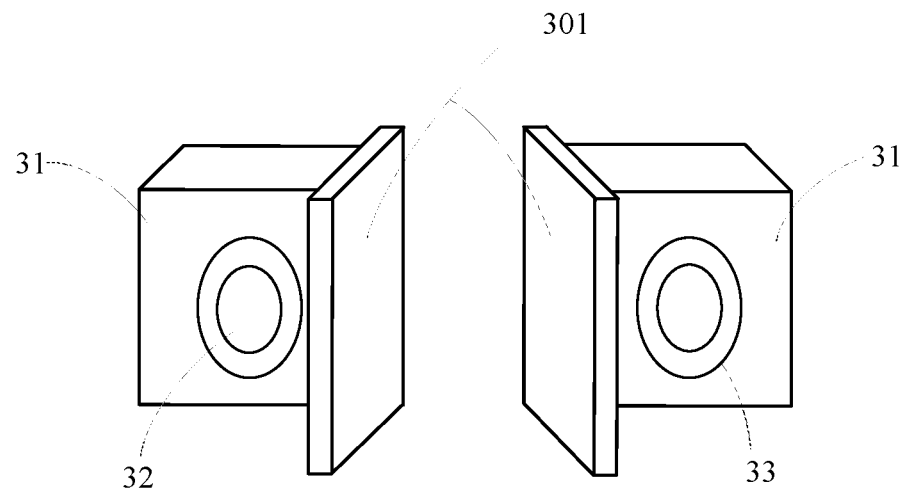
FIG. 7 is a schematic view of a second structure of a camera module according to an implementation of the present disclosure.

FIG. 7 is a schematic view of a second structure of a camera module according to an implementation of the present disclosure. As illustrated in FIG. 7, the camera module 30 further includes a second camera 33 disposed on the mounting base 31. When the driving structure 20 drives the camera module 30 to move to the outside of the main body 10, the first camera 32 faces the plane where the cover plate 11 is located, and the second camera 32 faces a plane where the back plate 142 of the housing 14 is located.

Figure 8:
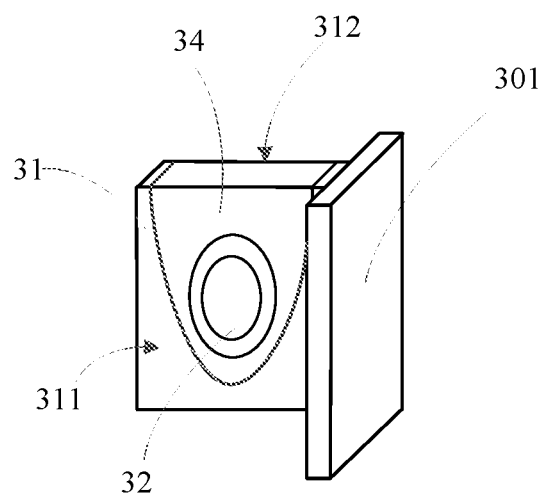
FIG. 8 is a schematic view of a third structure of a camera module according to an implementation of the present disclosure.
Figure 9:
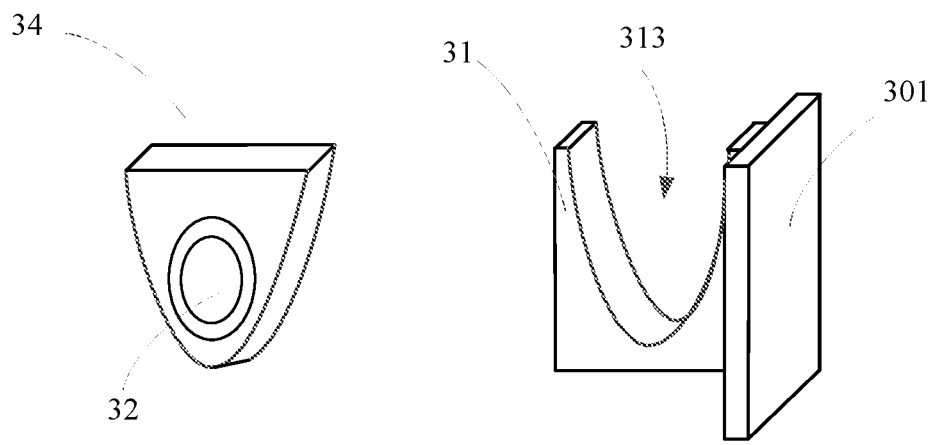
FIG. 9 is a schematic exploded view of the camera module as illustrated in FIG. 8.

FIG. 8 is a schematic view of a third structure of a camera module according to an implementation of the present disclosure, and FIG. 9 is a schematic exploded view of the camera module as illustrated in FIG. 8. In some implementations, as illustrated in FIG. 8 and FIG. 9, the mounting base 31 comprises a rotatable element 34. The first camera 32 is disposed on the rotatable element 34 such that the first camera 32 can be rotated to face the plane where the cover plate 11 is located or the plane where the back plate 142 of the housing 14 is located.

In some implementations, the mounting base 31 has a first end surface 311, a second end surface 312, and a groove 313 extending from the first end surface 311 to the second end surface 312. The first end surface 311 faces the plane where the cover plate 11 is located, while the second end surface 312 faces the plane where the back plate 142 of the housing 14 is located. The rotatable element 34 is located in the groove 313.

Figure 10:
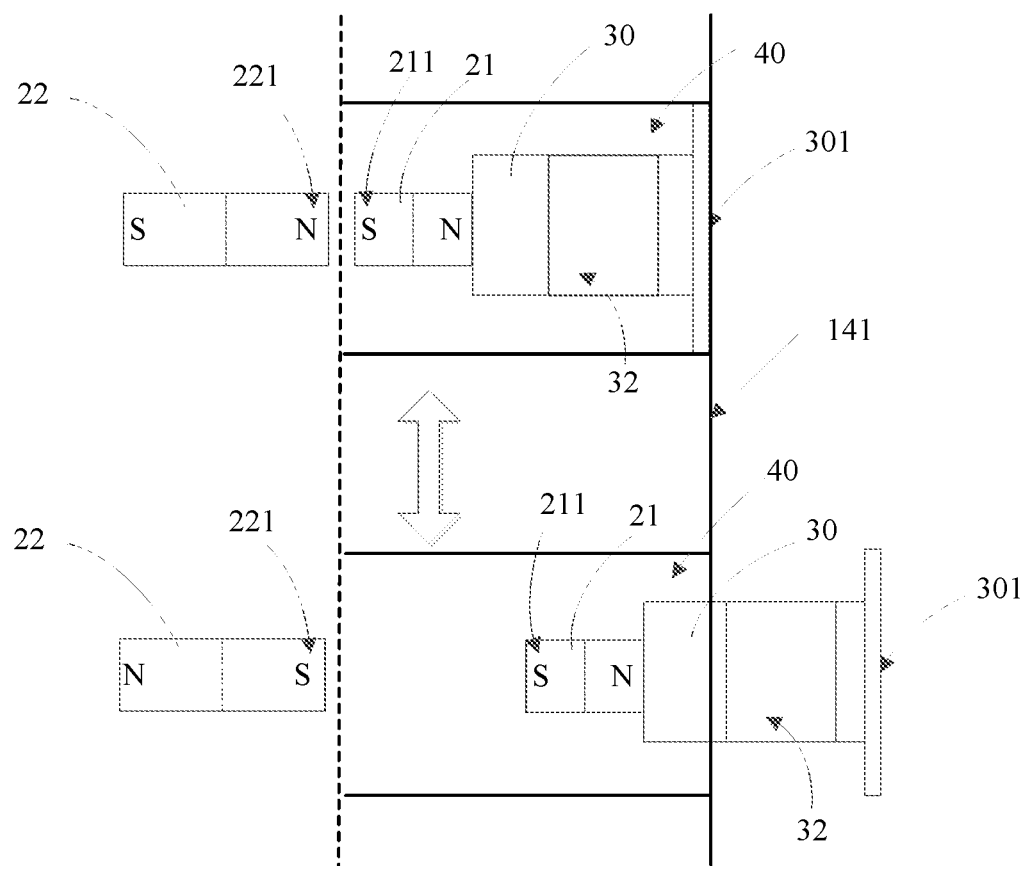
FIG. 10 is a schematic partial cross-sectional view of the terminal taken along line P1-P1 in FIG. 1.

FIG. 10 is a schematic partial cross-sectional view of the terminal 100 taken along line P1-P1 in FIG. 1. As illustrated in FIG. 10, the driving structure 20 is a pair of magnets including a first magnet 21 and a second magnet 22. The first magnet 21 has a first magnetic pole 211, and the second magnet 22 has a second magnetic pole 221. The first magnet 21 is connected to the camera module 30, and the first magnetic pole 211 of the first magnet 21 is opposite the second magnetic pole 221 of the second magnet 22. Since identical polarities repel while opposite polarities attract, the camera module 30 is driven to move from the inside of the receiving chamber 40 to the outside of the terminal 100 when the first magnetic pole 211 and the second magnetic pole 221 have identical polarities, or the camera module 30 is driven to move from the outside of the terminal 100 into the inside of the receiving chamber 40 when the first magnetic pole 21 and the second magnetic pole 22 have opposite polarities.

In some implementations, the first magnet 21 may be a permanent magnet and the second magnet 22 may be an electromagnet having a coil. The coil of the electromagnet may be energized by a driving circuit on the printed circuit board 13, and the direction of the current in the coil of the electromagnet can be changed by changing level parameters of the driving circuit. When the direction of the current is changed, the polarity of the magnetic pole of the electromagnet is also changed accordingly.

Figure 11:
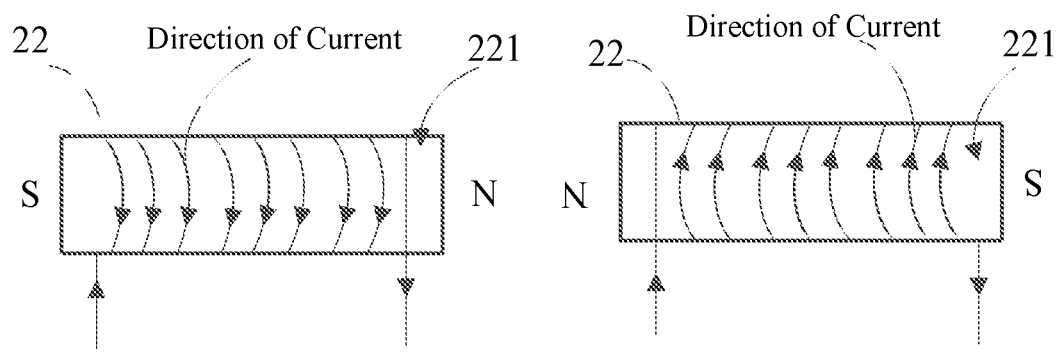
FIG. 11 is a schematic view of polarity change of an electromagnet according to an implementation of the present disclosure.

FIG. 11 is a schematic view of polarity change of the second magnet 22 according to an implementation of the present disclosure. As illustrated in FIG. 11, when a direction of a current in the coil is downward in FIG. 11, the second magnetic pole 221 is an N pole. Consequently, when the first magnetic pole 211 is an S pole, the first camera 32 is inside the main body 10. On the other hand, when the direction of the current in the coil is upward in FIG. 11, the second magnetic pole 221 is changed into the S pole. Consequently, when the first magnetic pole 211 is the S pole, the camera module 30 is driven to move outside the main body 10 such that the first camera 32 is moved beyond the circumferential wall 141 of the housing 14 and is exposed outside the receiving chamber 40.

Figure 12:
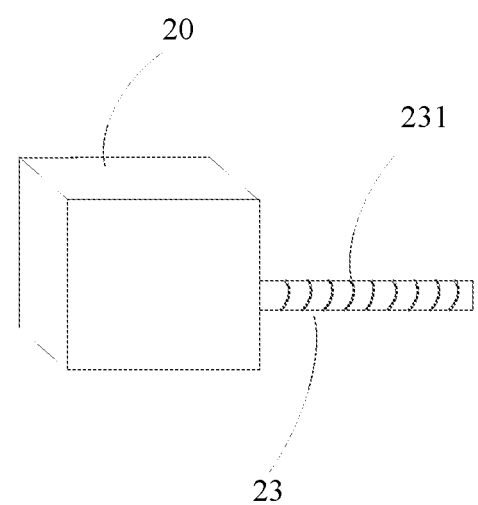
FIG. 12 is a schematic view of a driving structure according to an implementation of the present disclosure.
Figure 13:
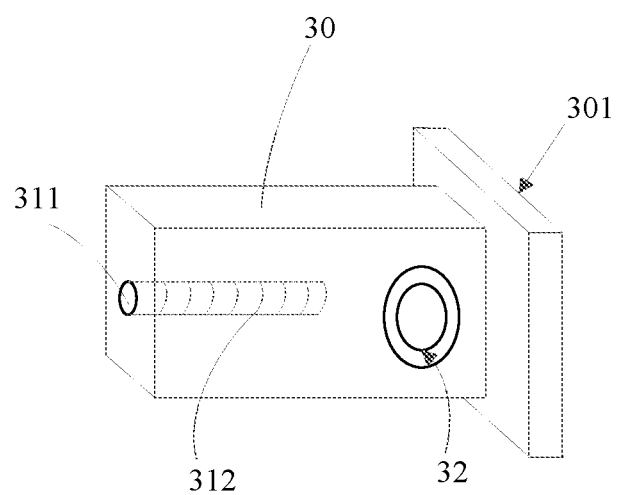
FIG. 13 is a schematic view of a fourth structure of a camera module according to an implementation of the present disclosure.
Figure 14:
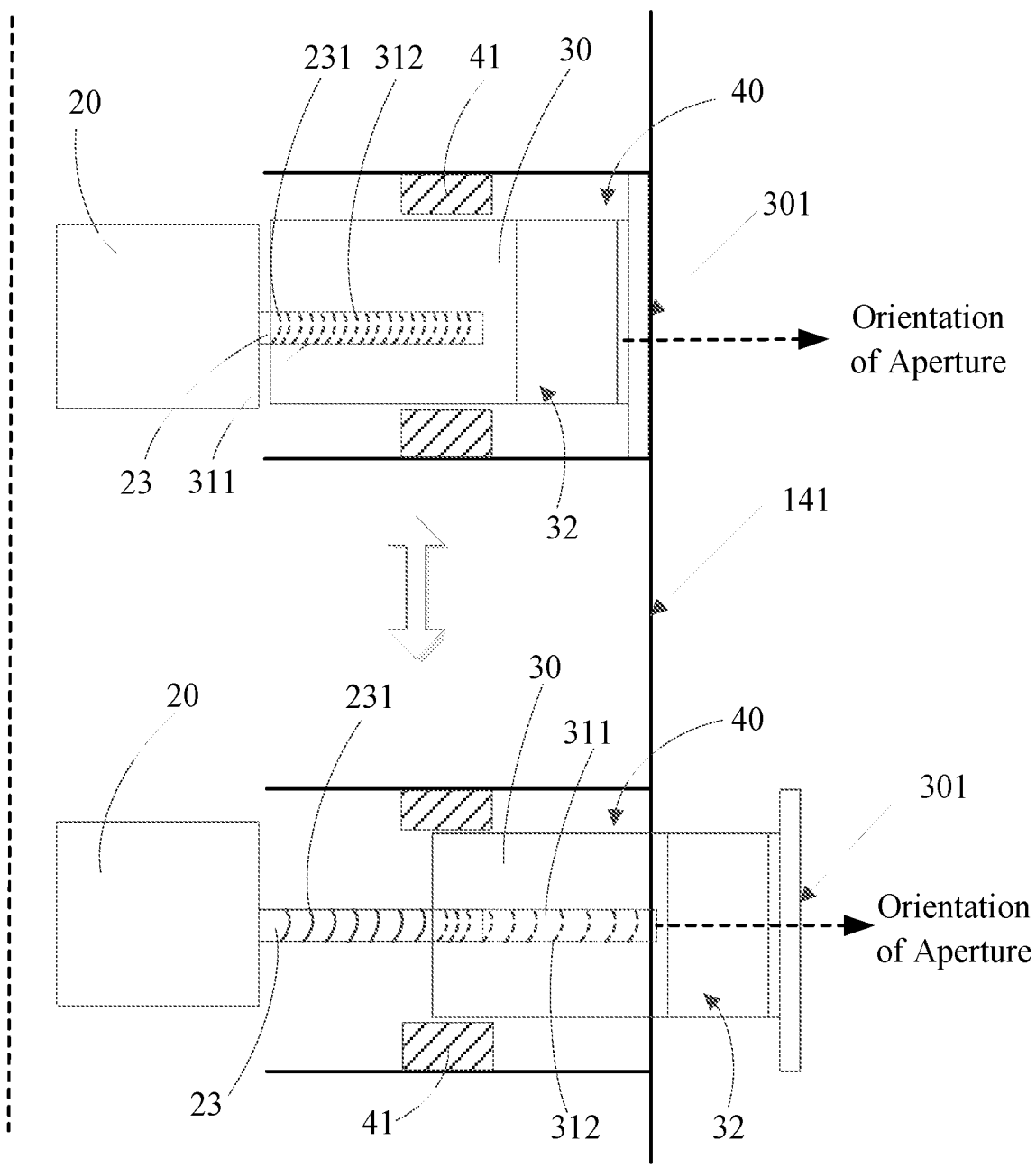
FIG. 14 is another schematic partial cross-sectional view of the terminal taken along line P1-P1 line in FIG. 1.

FIG. 12 is a schematic view of the driving structure 20 according to another implementation of the present disclosure. FIG. 13 is a schematic view of a fourth structure of the camera module 30 according to another implementation of the present disclosure. FIG. 14 is another schematic partial cross-sectional view of the terminal 100 taken along line P1-P1 line in FIG. 1. In some implementations, as illustrated in FIG. 14, the driving structure 20 may be a motor having a rotatable shaft 23 on which an external thread 231 is arranged. As illustrated in FIG. 14, the receiving chamber 40 is provided with a restricting element 41 configured to restrict the camera module 30 to moving in the orientation of the aperture of the receiving chamber 40. As illustrated in FIG. 13, the camera module 30 has a cavity 311 provided with an internal thread 312. The rotatable shaft 23 is screwed into the cavity 311 by means of the engagement of the external thread 231 and the internal thread 312. As illustrated in FIG. 14, when the rotatable shaft 23 is rotated, the camera module 30 is driven to move from the inside of the receiving chamber 40 to the outside of the main body 10 or is driven to move from the outside of the main body 10 into the inside of the receiving chamber 40.

In at least one implementation, the rotatable shaft 23 may be a cylinder, and accordingly, the cavity 311 may be a cylindrical space capable of receiving the cylinder.

According to the present disclosure, the camera module is received in the receiving chamber inside the terminal such that the camera module is invisible from the outside of the terminal, and the camera module can be driven to move to the outside of the terminal for image-capturing when it is to be used, such that the non-display area required for the camera-mounting hole is unnecessary in the display screen of the terminal, thereby effectively enlarging the display area of the display screen and achieving a large-sized display screen.

In order to facilitate an understanding of the present disclosure, reference has been made to the exemplary implementations illustrated in the drawings, and these implementations are described with specific language. However, this specific language is not intended to limit the scope of the present disclosure, and the exemplary implementations should be construed as encompassing all exemplary implementations that would normally occur to persons skilled in the art.

The words "mechanism", "element", "mode", "configuration" are used in a general sense, and are not limited to mechanical or physical implementations, but may include software programs combined with processors, etc.

The specific implementations illustrated and described herein are exemplary implementations of the present disclosure and are not intended to limit the scope of the present disclosure in any way. For the sake of brevity, conventional electronics, control systems, software development and other functional aspects of the systems (and components of the individual operating components of the systems) may not be described in detail. Furthermore, the connecting lines, or connectors illustrated in the various drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical". Technically, the words "include", "comprise", etc., used herein have open meanings respectively.

The use of the terms "a", "an", "the", and the like in the context of describing the present disclosure (especially in the appended claims) are to be construed as covering both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. In addition, the steps of all methods described herein can be performed in any suitable order unless otherwise indicated herein or otherwise clearly contradicted by context. The change in the present disclosure is not limited to the described order. The use of any and all implementations or exemplary language (e.g., "such as" or "for example") provided herein, is intended merely to better illuminate the present disclosure and does not pose a limitation on the scope of the present disclosure unless otherwise claimed. Numerous modifications and adaptations will be readily apparent to persons skilled in the art without departing from the spirit and scope of the present disclosure.

It should be understood that the exemplary implementations described therein should be considered in a descriptive sense only and not for purposes of limitation. Descriptions of features or aspects in each exemplary implementation should typically be considered as available for other similar features or aspects in other exemplary implementations. Although the present disclosure has been described with reference to exemplary implementations, various changes and modifications can be made by persons skilled in the art. The present disclosure is intended to cover these changes and modifications falling within the scope of the appended claims.

What is claimed is:

1. A terminal comprising a main body, a camera module, and a driving structure disposed in the main body, wherein
 a receiving chamber configured to receive the camera module is defined in the main body, wherein, the main body comprises a display screen with a display area, the receiving chamber is defined in the main body and position of the receiving chamber corresponds to one portion of the display area; and
 the driving structure is connected to the camera module to drive the camera module to move from the inside of the receiving chamber to the outside of the main body or drive the camera module to move from the outside of the main body into the inside of the receiving chamber;
 wherein the display screen merely comprises the display area configured to display information;
 wherein
 the main body comprises a front plate, a back plate opposite the front plate, and a circumferential wall connected to the front plate and the back plate;
 the receiving chamber has an aperture allowing the camera module to move into or out of the receiving chamber;
 the aperture is defined in the circumferential wall;
 the camera module comprises a mounting base connected to the driving structure and a first camera disposed on the mounting base;
 the mounting base comprises a rotatable element; the first camera is disposed on the rotatable element such that the first camera can be rotated to face a plane where the front plate is located or a plane where the back plate is located;
 the mounting base comprises a first end surface facing the plane where the front plate is located, a second end surface facing the plane where the back plate is located, and a groove extending through the first end surface and the second end surface; and
 the rotatable element is located in the groove.

2. The terminal of claim 1, wherein when the driving structure drives the camera module to move to the outside of the main body, the first camera faces a plane where the front plate is located.

3. The terminal of claim 1, wherein the camera module further comprises a second camera disposed on the mounting base.

4. The terminal of claim 3, wherein when the driving structure drives the camera module to move to the outside of the main body, the first camera faces a plane where the front plate is located, and the second camera faces a plane where the back plate is located.

5. The terminal of claim 1, wherein the camera module comprises a side wall which is located in the aperture when the camera module is received in the receiving chamber.

6. The terminal of claim 5, wherein the side wall has an inner surface and an outer surface; and
 when the camera module is received in the receiving chamber, the outer surface of the side wall is flush with an outer surface of the circumferential wall.

7. The terminal of claim 5, wherein a periphery of the side wall coincides with a periphery of the aperture.

8. The terminal of claim 1, wherein
 the camera module further comprises a side wall having an inner surface and an outer surface, the side wall is located in the aperture when the camera module is received in the receiving chamber; and
 the mounting base is located in the center or on the edge of the inner surface of the side wall.

9. The terminal of claim 1, wherein
 the camera module further comprises a side wall having an inner surface and an outer surface, the side wall is located in the aperture when the camera module is received in the receiving chamber; and
 the mounting base is plate-shaped, and the side wall is perpendicular to the mounting base.

10. The terminal of claim 1, wherein the driving structure is a pair of magnets comprising a first magnet having a first magnetic pole and a second magnet having a second magnetic pole;

the first magnet is connected to the camera module, and the first magnetic pole of the first magnet is opposite the second magnetic pole of the second magnet;

the camera module is driven to move from the inside of the receiving chamber to the outside of the terminal when the first magnetic pole and the second magnetic pole have identical polarities; or the camera module is driven to move from the outside of the terminal into the inside of the receiving chamber when the first magnetic pole and the second magnetic pole have opposite polarities.

11. The terminal of claim 10, wherein the first magnet is a permanent magnet and the second magnet is an electromagnet.

12. The terminal of claim 1, wherein the driving structure is a motor having a rotatable shaft on which an external thread is arranged;

the camera module has a cavity provided with an internal thread;

the rotatable shaft is screwed into the cavity by means of the engagement of the external thread and the internal thread; and when the rotatable shaft is rotated, the camera module is driven to move from the inside of the receiving chamber to the outside of the main body or is driven to move from the outside of the main body into the inside of the receiving chamber.

13. The terminal of claim 12, wherein the rotatable shaft is a cylinder, and the cavity is a cylindrical space capable of receiving the cylinder.

14. The terminal of claim 1, wherein the receiving chamber is provided with a restricting element configured to restrict the camera module to moving in an orientation of the aperture of the receiving chamber.

* * * * *